Nov 29, 1938.    S. CROMER ET AL    2,138,141
METHOD AND APPARATUS FOR TESTING MATERIALS
Filed Aug. 29, 1936

INVENTORS
Sylvan Cromer
BY and Irwin F. Bingham
Earl Babcock
ATTORNEY

Patented Nov. 29, 1938

2,138,141

UNITED STATES PATENT OFFICE 2,138,141

METHOD AND APPARATUS FOR TESTING MATERIALS

Sylvan Cromer and Irwin F. Bingham, Norman, Okla.

Application August 29, 1936, Serial No. 98,496

3 Claims. (Cl. 73—151)

The invention relates to the method and apparatus for testing materials and more particularly to the determining of the percentage or amount of gaseous fluids in liquid or plastic material.

It is often desirable to determine the amount of gas in a fluid. For example, in drilling oil wells or the like, the drilling fluid or mud often becomes laden with gas, especially where the drilling operation is taking place in formation containing gas. When this occurs the drilling fluid is referred to as being "gas cut". The addition of gas to the drilling fluid often interferes with the proper operation of the drill inasmuch as it lightens the weight of the mud fluid until it no longer overcomes the pressure in the bore of the well.

It is an object of the present invention, therefore, to provide a method and apparatus for determining the amount of gas in a fluid or plastic body of material, such as is obtained in drilling a well.

It is the further object of the invention to devise a method and apparatus which can be used in determining the percentage of gas in any body of fluid as for example oils or other liquids containing gas or air.

Other objects and advantages reside in certain novel features of the arrangement and construction of parts as will be apparent from the following description taken in connection with the accompanying drawing in which—

Figures 1, 2:
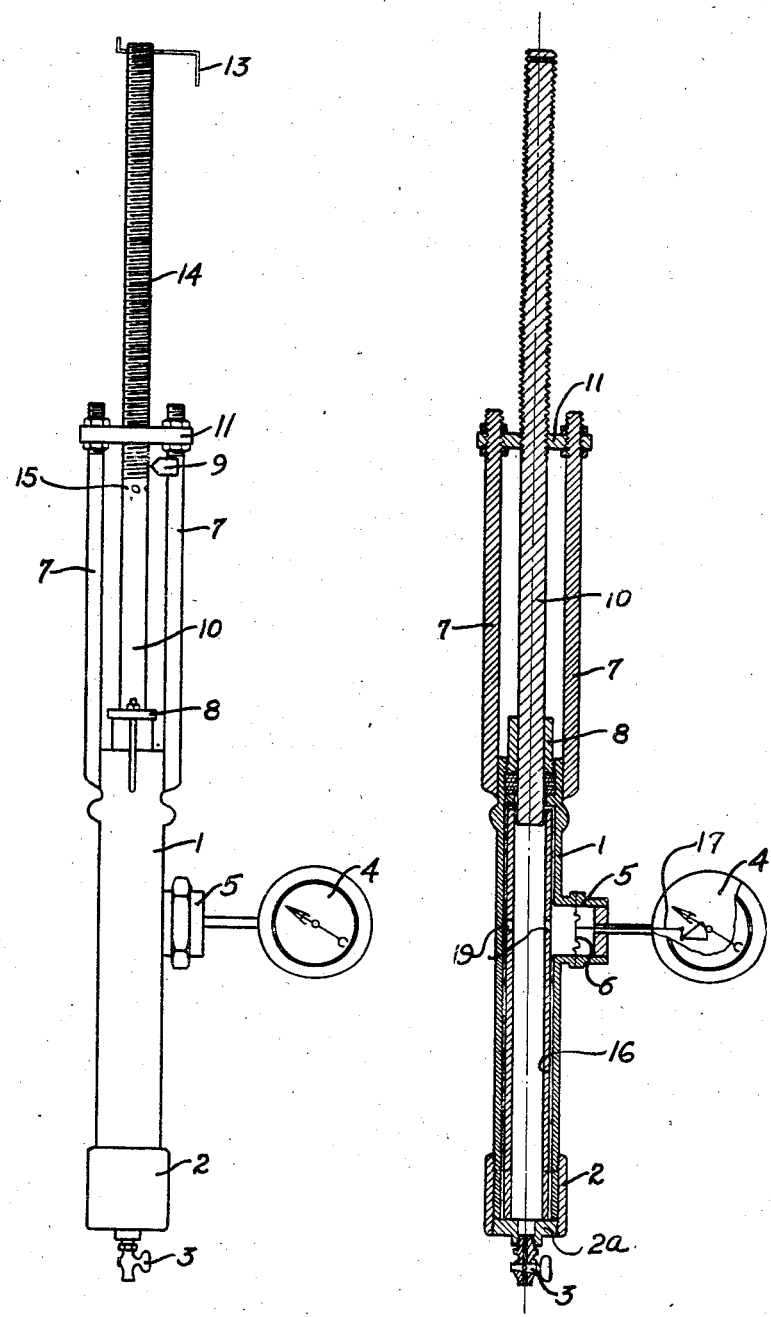
Fig. 1 is a view in side elevation of a testing device constructed in accordance with the present invention.
Fig. 2 is a view in vertical cross section of the testing device shown in Fig. 1 and illustrating the internal construction thereof.

Referring to the drawing in detail, it will be seen that the apparatus there shown consists of a cylindrical vessel designated 1 having a collar 2 and plug 2a at its lower end and a stuffing box or gland structure 8 secured to the upper end thereof. The plug 2a may have a pet-cock 3 secured thereto. The plug 2a is preferably secured to the collar 2 by means of a tool joint so that it may be removed and inserted in the collar a number of times without altering the volume of the space in the vessel 1.

On the inside of the cylindrical vessel 1 an extension may be provided to form a pressure chamber in communication with the interior of the vessel. This pressure chamber has a flexible diaphragm 6 mounted therein in such a way that it may be moved back and forth in response to pressure variations within the vessel. A pressure indicator 4 which may be of usual construction may be connected with the diaphragm 6 to be moved thereby and indicate the pressure in the vessel 1.

In the arrangement illustrated a suitable link mechanism 17 is diagrammatically shown for transmitting movement of the diaphragm 6 to the pressure indicator 4.

The linkage mechanism is used to actuate the indicator in response to movement of the diaphragm as illustrated. The diaphragm may be made of corrugated metal.

A tight seal must be maintained to prevent mud or fluid from passing the diaphragm.

On the upper end of the vessel 1 near the stuffing box 8, suitable supporting structure such as the guides 7 are provided to hold a plunger 10 in operative position. The plunger 10 extends through the stuffing box 8 and may be moved in and out of the vessel 1 to change the volume of the vessel by means of the screw threads 14 which cooperate with the threads in a hole in the cross piece 11 secured to the guides 7. The upper end of the plunger 10 may be provided with a crank or handle 13 so that the plunger may be rotated and moved in and out of the vessel 1. It it to be noted that the position of the handle 13 would also indicate fractions of a turn and thus provide accurate means for indicating the position of the plunger. In addition an indicator 9 may be mounted upon one of the guides 7 to aid in counting the number of threads the plunger has been moved. A zero mark 15 may be placed upon the plunger to aid in indicating its position.

Within the vessel 1 a liner 16 may be provided. This liner may be simply a cylinder adapted to receive the plunger 10. It may fit rather tightly about the plunger although, of course, this is not necessary to practice the invention. The liner 16 may be provided with openings 19 through which fluid may pass and thus actuate the diaphragm 6.

The liner 16, occupying a known volume, is used in the case of unusually high ratios of gas to liquid in the sample under test. Under other conditions, the volume of the sample undergoing test may be increased by removing the liner.

The apparatus illustrated may be used to determine the amount of gaseous fluid in a body of material as follows:

The plug 2a may be removed and, with the plunger 10 raised until the zero mark 15 is a slight distance above the pointer 9, the vessel 1 is filled with the sample to be tested. Care must be exercised in removing all air from the vessel in filling it with the sample. To aid in doing this, the vessel is preferably turned upside down from the position shown in the drawing.

After the vessel is filled with the sample, the plug 2ª is replaced.

With the cock 3 open, the plunger 10 may now be lowered to the zero position, a portion of the sample exuding from the cock 3 and the pressure in the vessel remaining at atmospheric pressure.

The cock 3 may now be closed and the plunger 10 may now be lowered slightly to compress the fluids within the vessel 1 by subjecting them to a smaller volume. The pressure will be correspondingly increased as will be indicated by the gauge 4.

If now the changes in volume and the changes in pressure can be accurately read the amount of gaseous fluid within the vessel 1 can be calculated, and if the volume of the vessel 1 is known the ratio of gaseous fluid to liquid and solid material can be calculated.

To accurately read the changes in volume all that need be done is calibrate the plunger 10. For example if the plunger 10 is one square inch in cross-sectional area and the threads 14 are five to the inch, each turn of the plunger 10 will displace one-fifth of a cubic inch.

Since the change in volume of the vessel 1 can thus readily be determined and the pressure within the vessel indicated by the gauge 4, it will be apparent to those skilled in the art that the well known law for the behavior of gases arises. This law is to the effect that the volume of the gas is inversely proportional to the pressure in a closed vessel. Therefore, when the volume of the vessel 1 is changed and the amount of change noted, the quantity of gas within the vessel can be determined, even though the total volume of the vessel is not known.

In order to determine the ratio of gas to liquid and solid matter all that need be known in addition to the data obtained by the test is the total volume of the vessel.

If desired, the plunger 10 may be marked with indicia of the percentage of "gas cut" in the mud or fluid. The instructions for operation should then be merely to insert the plunger 10 until a definite pressure is indicated on the page, say 30 pounds per square inch. If the plunger is calibrated accordingly, the percentage of gas in the sample can then be read to an approximate value directly, without any calculation. This reading would not be entirely accurate, because variations in atmospheric pressure would affect the calibration, but it would be approximate and if more accurate data were desired, calculations could still be made by comparing the initial volume and pressure with the final volume and pressure.

Some slight errors due to expansion or contraction of the gas within the vessel as the result of temperature change may creep into the calculations. To avoid this the apparatus may be placed in a body of water during the test or allowed to reach an equilibrium temperature before taking the pressure readings.

It will be apparent to those skilled in the art that the apparatus may be used in making comparative tests without actually making calculations to determine the exact amount of gaseous fluid in any given sample under test.

While only one embodiment of the invention has been shown and described herein it is obvious that various changes may be made without departing from the spirit of the invention or the scope of the annexed claims.

We claim:

1. Apparatus for determining the amount of gaseous fluid in a body of liquid or plastic material and including a closed vessel having a stuffing box therein, a plunger mounted in said stuffing box for changing the volume of said cylinder, means for moving the plunger in or out of said stuffing box predetermined distances, indicating means for accurately showing the amount the plunger has moved through the stuffing box, a pressure gauge connected to said vessel, a diaphragm for protecting the pressure gauge from fluids in the vessel and a liner within the vessel having ports therein enabling the diaphragm to move in response to pressure changes within the liner, and thereby affect the reading of the pressure gauge, the arrangement being such that the pressure gauge measures the pressure changes in said vessel in response to the changes in volume made therein by movement of said plunger.

2. The method of testing mud used in the drilling of an oil well or the like to determine if it is "gas cut", which includes placing a sufficient quantity of mud in a closed vessel to normally completely fill the same, subjecting the same to variations in volume-pressure relationships and computing the percentage of compressible fluid in the vessel in accordance with known laws for the behavior of gaseous fluids, to thereby obtain an indication of the presence of gas in the mud and an indication of the amount of gas therein.

3. The method of determining the gaseous content of mixtures containing an incompressible substance and a compressible fluid, which includes placing a sufficient quantity of the mixture in a closed chamber to normally substantially fill the same, subjecting the mixture to variations in volume-pressure relationships and computing the percentage of compressible fluid in the chamber in accordance with known laws for the behavior of gaseous fluids, to thereby obtain an indication of the presence of gaseous content in the mixture and an indication of the amount of gaseous fluid therein.

SYLVAN CROMER.
IRWIN F. BINGHAM.